United States Patent
Odagiri et al.

[11] Patent Number: 5,883,768
[45] Date of Patent: *Mar. 16, 1999

[54] RECORDING MEDIUM ORGING PAD

[75] Inventors: Hirokazu Odagiri; Ko Ishikawa, both of Miyagi, Japan

[73] Assignee: Sony Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 687,021

[22] Filed: Jul. 25, 1996

[30] Foreign Application Priority Data

Aug. 4, 1962 [JP] Japan ..................... 7-199992

[51] Int. Cl.$^6$ .................................... G11B 15/60
[52] U.S. Cl. ........................................ 360/130.31
[58] Field of Search ............................ 360/130.3, 130.33

[56] References Cited

U.S. PATENT DOCUMENTS 3,682,486  8/1972  Zwetzig et al. ............ 360/130.33
4,922,361  5/1990  Bordignon ................. 360/130.31

Primary Examiner—Robert S. Tupper
Attorney, Agent, or Firm—Ronald P. Kananen

[57] ABSTRACT

A recording medium urging pad can urge a recording medium such as a magnetic tape against a recording and reproducing head stably and reliably. A head pad (10) fixed to a supporting member such as a leaf spring (9) comprises a first layer (10a) with a low elastic modulus contacting with a magnetic tape (T) and a second layer (10b) with an elastic modulus higher than that of the first layer (10a) fixed to the leaf spring (9), wherein a thickness (Ta) of the first layer (10a) and a thickness (Tb) of the second layer satisfy the following equation expressed as:

$$20\% \leq \frac{Ta}{Ta + Tb} \times 100 \leq 45\%$$

and the first and second layers (10a) and (10b) are bonded by an adhesive (10c).

5 Claims, 4 Drawing Sheets

RECORDING MEDIUM ORGING PAD

BACKGROUND OF THE INVENTION

The present invention relates to a recording medium urging pad disposed in a tape cassette or the like for urging a recording medium such as a magnetic tape or magnetic disk against a fixed-type magnetic head.

Magnetic recording and reproducing apparatus having a fixed-type magnetic head use a magnetic tape housed in a tape cassette as a recording medium and include a head pad disposed within a tape cassette for satisfactorily urging a magnetic tape housed within a tape cassette against the magnetic head. The magnetic tape is urged against the magnetic head by this head pad.

As head pads for tape cassette, there are known head pads in which a felt material is attached to a plate-like resilient material. Specifically, a felt pad formed of a rabbit fur, wool and synthetic fiber is attached to a spring phosphor bronze plate or the like.

The thus arranged head pad is disposed within a tape cassette at the position inside a magnetic tape transport portion in an opposing relation to an opening portion into which a magnetic head is inserted. When the magnetic head is inserted into the tape cassette from the opening portion under the condition that the tape cassette is loaded onto a magnetic recording and reproducing apparatus, the magnetic head and the head pad respectively, engage the magnetic tape on the recording surface side and the back surface, whereby the magnetic tape is urged against the magnetic head by a resilient force of the head pad.

However, if the magnetic tape is transported by the magnetic recording and reproducing apparatus many times, then when a tape base surface is rough, tape cassette resin fixed pins in contact with a tape base surface are worn out so that a relative position between a magnetic tape running surface and the magnetic head becomes abnormal. Therefore, if the head pad felt has a high elasticity modulus, then a contact of the magnetic tape with the magnetic head becomes imperfect, thereby lowering a power of a recording signal or increasing a phase fluctuation.

It is proposed that a head pad 21 is formed by attaching a felt pad 23 made of fiber with low elasticity modulus on a leaf spring 22 as shown in FIGS. 1 and 2. In this case, when the magnetic tape T is transported, the felt pad 23 is subject to lateral creep due to stress (FIG. 2). The felt pad 23 is subject to creep due to stress associated with the low elasticity modulus of the felt pad 23 which hinders a compatibility between the tape cassette and the magnetic recording and reproducing apparatus, thereby exerting a bad influence on the output signal.

SUMMARY OF THE INVENTION

In view of the aforesaid aspect, it is an object of the present invention to provide a recording medium urging pad by which a recording medium is stably contacted with a recording and reproducing head thereby to supply an output of a recording and reproducing apparatus stably and reliably.

According to an aspect of the present invention, there is provided a recording medium urging pad fixed to a supporting member for urging a recording medium against a recording and reproducing head which is comprised of a first layer with a low elastic modulus in contact with a recording medium, and a second layer with an elastic modulus higher than that of the first layer and fixed to the supporting member, wherein when Ta assumes a thickness of the first layer and Tb assumes a thickness of the second layer, the thickness Ta of the first layer satisfies the following equation expressed as:

$$20\% \leq \frac{Ta}{Ta + Tb} \times 100 \leq 45\%$$

As described above, the recording medium urging pad according to the present invention comprises two layers. Since the first layer in contact with the recording medium is low in elasticity modulus and a thickness thereof occupies 20% to 45% of the overall thickness of the pad, an adhesive for bonding the first and second layers can be prevented from being leaked onto the surface of the first layer. Also, an adhesive strength for the second layer can be prevented from being reduced and the first layer can be bonded to the second layer reliably. Therefore, the pad can be stably contacted with the recording medium so that the recording medium and the recording and reproducing head can be urged against each other stably and reliably.

DETAILED DESCRIPTION OF THE PREFERRED EMBODIMENT

Figure 4:
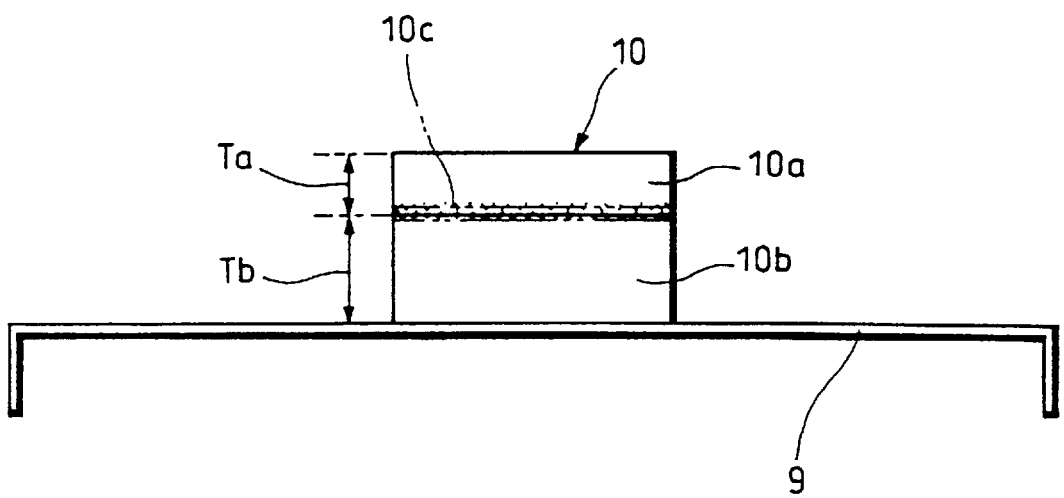
FIG. 4 is a plan view illustrating a manner in which the pad according to the present invention is applied to a head pad of a tape cassette.
Figure 5:
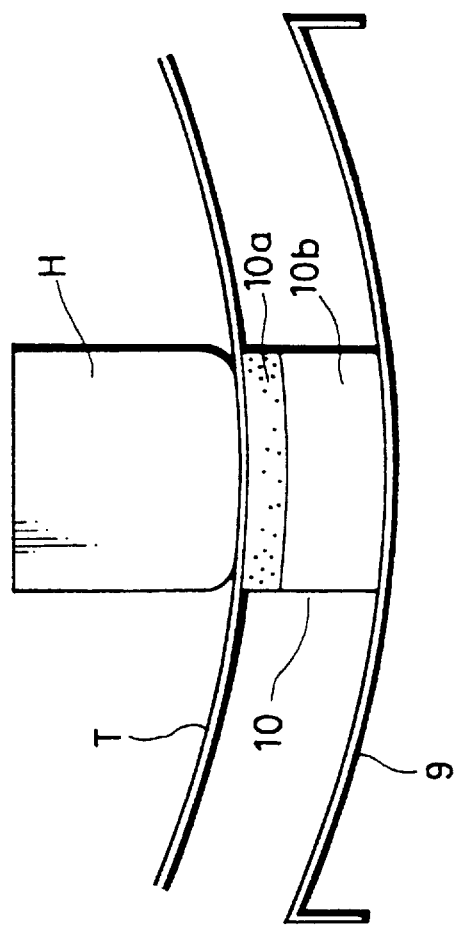
FIG. 5 is a plan view illustrating the operational state of the head pad shown in FIG. 4.

A manner in which the present invention is applied to a head pad of a tape cassette will be described below with reference to FIGS. 3 to 5.

Figure 1:
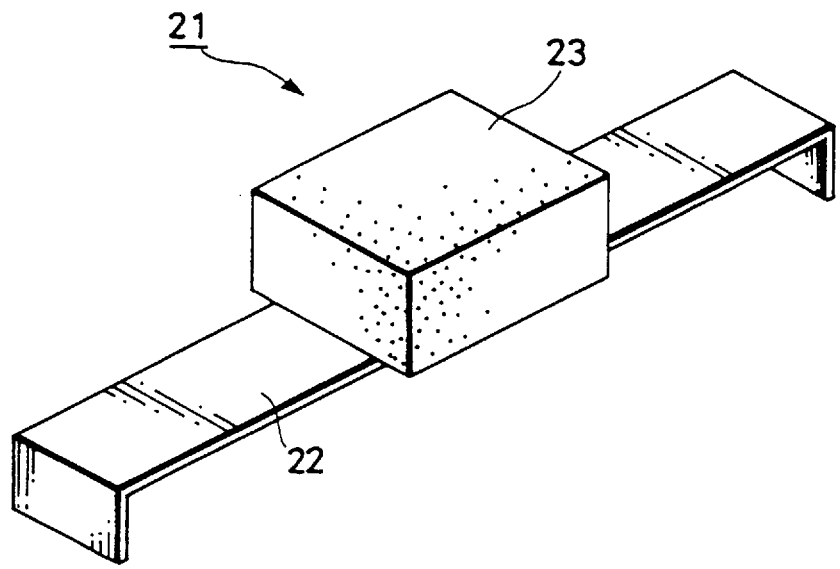
FIG. 1 is a perspective view illustrating a conventional head pad.
Figure 2:
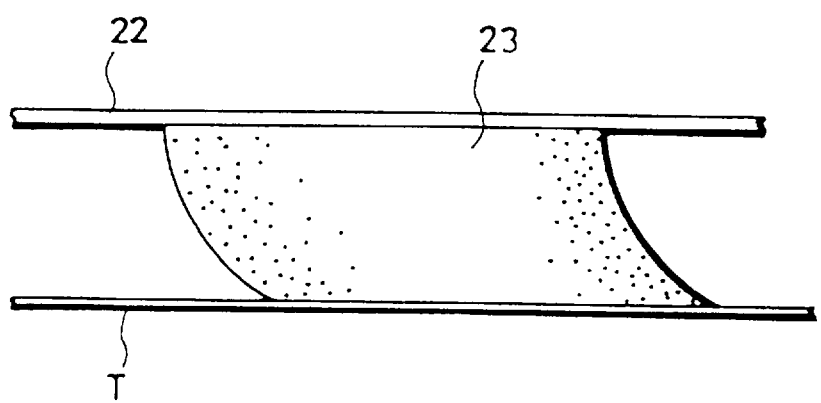
FIG. 2 is a plan view used to explain the operational state of the head pad shown in FIG. 1.

FIG. 1 is a perspective view illustrating a tape cassette to which the present invention is applied in a partly cutaway fashion. A tape cassette, generally depicted at reference numeral 1 in FIG. 3, includes a cassette housing 2 formed by fastening an upper cassette shell 3 and a lower cassette shell 4. The cassette housing 2 houses therein mechanism assemblies such as a pair of reel hubs 5, 6 around which a magnetic tape T is wound, guide rollers 7, 8 for guiding the magnetic tape T toward a tape transport portion direction, a pair of lubricant sheets (not shown) for holding the magnetic tape T wound between the reel hubs 5,6 in the upper and lower direction, a head pad 10 attached to a leaf spring 9 and a shield plate 11.

Figure 3:
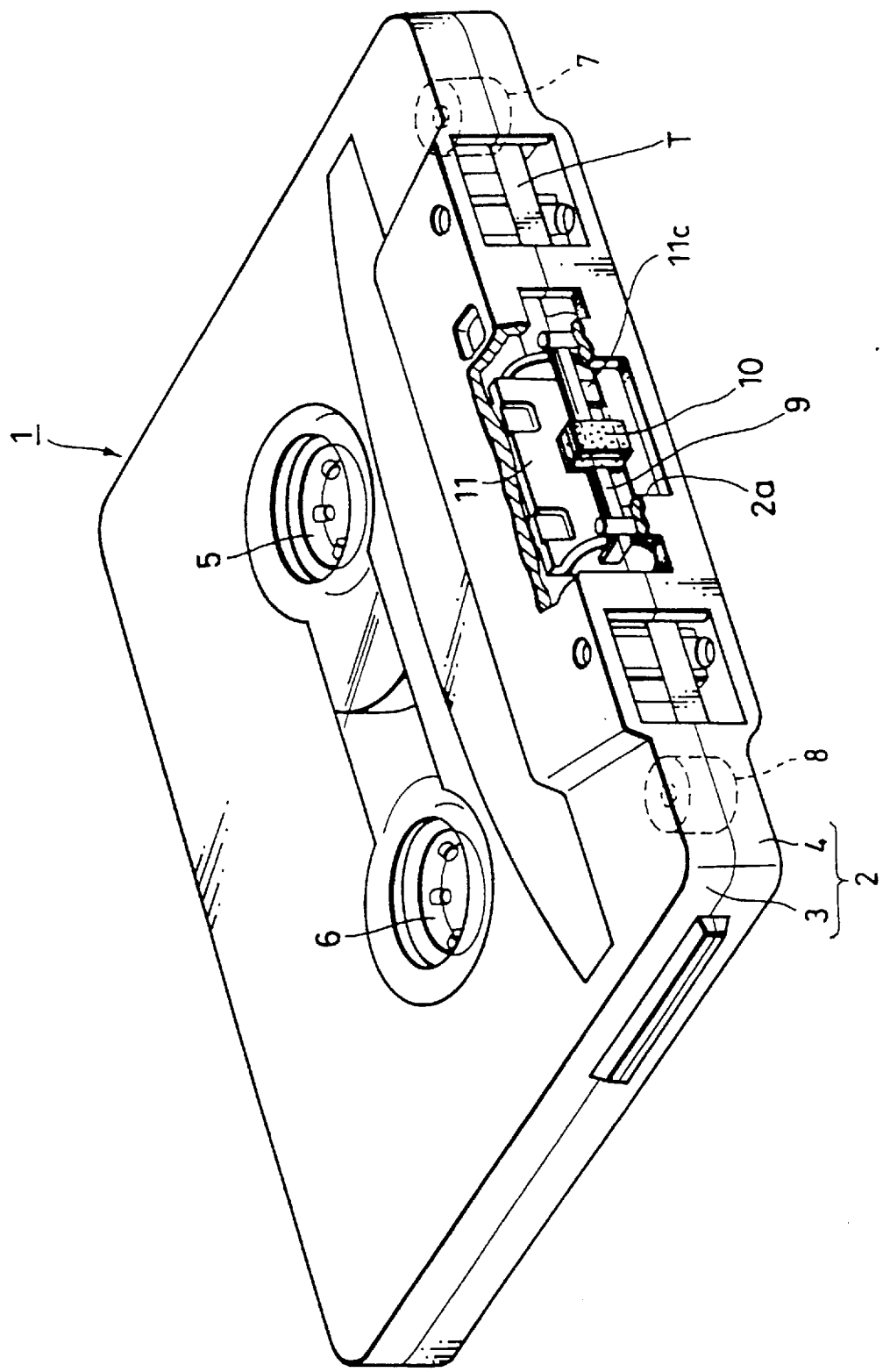
FIG. 3 is a perspective view illustrating a tape cassette having a pad according to the present invention in a partly cutaway fashion.

In this embodiment, as shown in FIG. 3, the head pad 10 is attached to the leaf spring 9 which is disposed within the cassette housing 2 such that the leaf spring 9 is opposed to the opening 2a defined at the central surface to receive the magnetic head (not shown) and which is located at the inside off the tape transport portion. As shown in FIG. 4, the head pad 10 comprises two layers of a first layer 10a contacting with the magnetic tape T and a second layer 10b bonded to the leaf spring 10b. The first layer 10a is formed of a felt with low elasticity modulus, e.g., polyfluorocarbon fiber such as polytetrafluoroethylene resin (PTFE), polyfluoroethylenepropylene resin (FEP) or polytetrafluoroethyleneperalkoxyethylene resin (PFA). The second layer 10b is formed of a conventional felt material such as rabbit fur, wool or synthetic fiber. The felt material of the second layer 10b has an elasticity modulus higher than that of the first layer 10a.

A thickness Ta of the first layer 10a and a thickness Tb of the second layer 10b in this head pad 10 satisfies the following equation (1):

$$20\% \leq \frac{Ta}{Ta + Tb} \times 100 \leq 45\% \quad (1)$$

The first layer 10a and the second layer 10b are integrally bonded and laminated by an adhesive 10c.

In the head pad 10 comprising the first and second layers 10a and 10b which satisfies the above equation (1), the second layer 10b having an elasticity modulus higher than that of the first layer 10a made of felt with low elasticity modulus is able to maintain a proper urging force to urge the magnetic tape T against the magnetic head H without being subject to by stress generated when the magnetic tape T is transported. Thus, the magnetic head H and the magnetic tape T can be contacted with each other stably and reliably by a flexibility of the first layer 10a itself.

However, in the head pad 10 with the double-layer structure, if the thickness Ta of the first layer 10a is less than 20% of the overall thickness (Ta+Tb) of the head pad 10, then the adhesive 10c for bonding the first and second layers 10a and 10b is leaked onto the surface of the first layer 10a and such leaked adhesive 10c is cured with the result that the elasticity of the first layer 10a is deteriorated and that the magnetic tape will be damaged.

If the thickness Ta of the first layer 10a of the head pad 10 becomes greater than 45% of the overall thickness (Ta=Tb), then an adhesive strength of the first layer 10a for the second layer 10b is decreased. Therefore, if the magnetic tape is transported many times, then the first layer 10a will be detached from the second layer 10b. Further, since the polyfluorocarbon fiber forming the first layer 10a is expensive, if the thickness of the first layer 10a is increased, a large amount of polyfluorocarbon fibers should be used, which makes the pad expensive.

Inventitve example

An inventive example of the head pad 10 will be described.

The first layer 10a of the head pad 10 was made of polyflurorocarbon fiber felt such a polytetrafluoroethylene resin fiber felt, and the thickness Ta was 0.7 mm. The second layer 10b was made of a wool felt, and the thickness Tb was 1.1 mm. The felt of the first layer 10a and the felt of the second layer 10b was bonded together by using an industrial bonding agent as the adhesive 10c and thereby the head pad 10 with the double-layer structure with a thickness of 1.8 mm was formed.

An elasticity modulus of the head pad 10 with such double-layer structure was 12.14 gf/mm². In this connection, an elasticity modulus obtained when the head pad is formed of a single layer of polytetrafluoroethylene resin fiber felt was 10.421 gf/mm². An elasticity modulus obtained when the head pad is formed of a single layer of wool felt was 13.458 gf/mm². Further, an elasticity modulus obtained when the head pad is formed of a single layer of rabbit fur felt was 14.638 gf/mm².

As described above, since the elasticity modulus of the head pad 10 with the double-layer structure according to this embodiment becomes lower than those of the head pad which is formed of the single layer of wool felt or rabbit fur felt, the head pad 10 according to the present invention can be contacted with the magnetic tape stably, and hence the magnetic head and the magnetic tape can be urged against each other reliably.

It was proved that an adhesive strength between the first layer 10a made of polytetrafluoroethylene resin felt and the second layer 10b made of wool felt of the head pad 10 according to this embodiment was changed with a ratio of the first layer 10a, i.e., a ratio of the thickness Ta of the first layer 10a relative to the whole thickness (Ta+Tb) of the head pad 10.

Specifically, as described above, when the thickness Ta of the first layer 10a was 0.7 mm and the thickness Tb of the second layer 10b was 1.1 mm, the ratio of the first layer 10a was 38.90%. An adhesive strength in that case was 0.75 kgf.

When the ratio of the thickness of the first layer 10a relative to the whole thickness of the head pad 10 was 51.80%, the adhesive strength was 0.50 kgf. When the ratio was 56.40%, the adhesive strength was 0.10 kgf. As described above, it was proved that, when the ratio of the thickness Ta of the first layer 10a relative to the overall thickness (Ta+Tb) of the head pad 10 was selected to be greater than 45%, i.e., the thickness Ta of the first layer 10a was increased, the adhesive strength was lowered.

Substantially equal results were obtained when the overall thickness of the head pad 10 was 2 mm, the thickness of the first layer 10a made of polyfluorocarbon fiber felt was 0.4 mm to 0.9 mm and the thickness of the second layer 10b made of the aforementioned felt was 1.6 mm to 1.1 mm.

As described above, in the head pad 10 according to this embodiment, the first layer 10a contacting with the magnetic tape is made of a felt with a low elasticity modulus, e.g., polyfluorocarbon fiber felt such as PTFE. Also, the second layer 10b fixed to the supporting member such as the leaf spring 9 is made of a felt with an elasticity modulus higher than that of the felt of the first layer 10a, e.g., conventional felt such as rabbit fur, wool or synthetic fiber. Then, the ratio of the first layer 10a relative to the whole thickness (Ta+Tb) of the head pad 10 is selected in a range of from 20% to 45%. Therefore, the head pad 10 can stably be urged against the magnetic tape by a flexibility of the first layer 10a itself. Since the elasticity modulus of the second layer 10b is higher than that of the first layer 10a, the head pad 10 can be urged against the magnetic head with a proper pressure so that the magnetic head and the magnetic tape can be closely contacted with each other stably. Furthermore, since the polyfluorocarbon fiber felt forming the first layer 10a has an excellent slidability relative to polyethylenetelephthalate (PET) forming a base film of the magnetic tape so that the magnetic tape can be transported stably and smoothly.

As described above, while the present invention is applied to the head pad for urging the magnetic tape against the magnetic head, the present invention is not limited thereto and may be applied to a head pad for urging a magnetic disk against the recording and reproducing head. Further, the supporting member for supporting the head pad is not limited to the elastic member such as a leaf spring and may be a fixed member.

As described above, according to the present invention, since the head pad for urging the recording medium against the recording and reproducing head side is formed of the two layers of the first layer with the low elasticity modulus contacting with the recording medium and the second layer with the elasticity modulus higher than that of the first layer fixed to the supporting member and the thickness of the first layer is set in a range of from 20% to 45% of the whole thickness of the head pad, the adhesive for bonding the first and second layers can be prevented from being leaked onto the surface of the first layer. Also, the adhesive strength between the two layers can be prevented from being deteriorated and the two layers can be bonded together reliably. Furthermore, since the second layer has the elasticity modulus higher than that of the first layer, the head pad can maintain a proper pressure against the recording and reproducing head, whereby the recording and reproducing head can be urged against the recording medium stably by a flexibility of the first layer itself. Therefore, the recording medium can be recorded and reproduced stably, thereby improving the reliability.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A recording medium urging pad fixed to a supporting member for urging a recording medium against a recording and reproducing head comprising:

a first layer made of a polytetrafluoroethylene fiber felt for contacting a recording medium, said fiber felt having an elasticity modulus less than 12 gf/mm$^2$; and a second layer with an elastic modulus higher than that of said first layer and fixed to said supporting member, wherein when Ta assumes a thickness of said first layer and Tb assumes a thickness of said second layer, the thickness Ta of said first layer satisfies the following equation expressed as:

$$20\% \leq \frac{Ta}{Ta + Tb} \times 100 \leq 45\%.$$

2. A recording medium urging pad as claimed in claim 1, wherein said first layer of said pad has a thickness ranging from 0.4 mm to 0.9 mm.

3. A recording medium urging pad as claimed in claim 1, wherein said first layer and said second layer are bonded by an adhesive.

4. A recording medium urging pad as claimed in claim 2, wherein said second layer has a thickness ranging from 1.6 mm to 1.1 mm.

5. A recording medium urging pad fixed to a supporting member for urging a recording medium against a recording and reproducing head comprising:

a first layer, made of a polyfluoroethylenepropylene fiber felt, or a polytetrafluoroethyleneperalkoxyethylene fiber felt, for contacting a recording medium; and a second layer with an elastic modulus higher than that of said first layer and fixed to said supporting member, wherein when Ta assumes a thickness of said first layer and Tb assumes a thickness of said second layer, the thickness Ta of said first layer satisfies the following equation expressed as:

$$20\% \leq \frac{Ta}{Ta + Tb} \times 100 \leq 45\%.$$

* * * * *

UNITED STATES PATENT AND TRADEMARK OFFICE
CERTIFICATE OF CORRECTION

PATENT NO. : 5,883,768
DATED : March 16, 1999
INVENTOR(S) : Hirokazu Odagiri and Ko Ishikawa It is certified that error appears in the above-identified patent and that said Letters Patent is hereby corrected as shown below:

On the title page, item [54], and in column 1, line 1 :

The title should read:

-- RECORDING MEDIUM URGING PAD --.

Signed and Sealed this

Sixth Day of July, 1999

Attest:

Q. TODD DICKINSON

Attesting Officer

Acting Commissioner of Patents and Trademarks